United States Patent
Hayase et al.

(10) Patent No.: US 11,531,579 B2
(45) Date of Patent: *Dec. 20, 2022

(54) SEMICONDUCTOR DEVICE AND SYSTEM USING THE SAME

(71) Applicant: RENESAS ELECTRONICS CORPORATION, Tokyo (JP)

(72) Inventors: Kiyoshi Hayase, Tokyo (JP); Shinichi Shibahara, Tokyo (JP); Yuki Hayakawa, Tokyo (JP); Yoichi Yuyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,630

(22) Filed: Oct. 5, 2021

(65) Prior Publication Data

US 2022/0027225 A1    Jan. 27, 2022

Related U.S. Application Data

(63) Continuation of application No. 16/859,463, filed on Apr. 27, 2020.

(51) Int. Cl.
*G06F 11/00* (2006.01)
*G06F 11/07* (2006.01)

(52) U.S. Cl.
CPC ...... *G06F 11/0757* (2013.01); *G06F 11/0721* (2013.01)

(58) Field of Classification Search
CPC .......................... G06F 11/0757; G06F 11/0721
See application file for complete search history.

(56) References Cited

U.S. PATENT DOCUMENTS 7,944,772 B2 * 5/2011 Ahn ...................... H03L 7/0816
365/194
2004/0160343 A1    8/2004 Sprouse
(Continued)

FOREIGN PATENT DOCUMENTS

EP          3573240 A1    11/2019
JP       2010-211347 A     9/2010

OTHER PUBLICATIONS

Extended European Search Report issued in corresponding European Patent Application No. 21170023.2-1224, dated Oct. 4, 2021.
(Continued)

*Primary Examiner* — Katherine Lin
(74) *Attorney, Agent, or Firm* — McDermott Will & Emery LLP (57) ABSTRACT

A semiconductor device has a timer unit and a processing unit. The timer unit includes a binary counter, a first converter that converts a first count value output from the binary counter to a gray code to output as first gray code data. The processing unit includes a first synchronizer that captures the first gray code data transferred from the timer unit in synchronization with the system clock signal and outputs the captured first gray code data as second gray code data, and a fault detection unit that generates a data for fault detection based on the first gray code data transferred from the timer unit and compares a second count value based on the second gray code data with a third counter value based on the data for fault detection.

9 Claims, 9 Drawing Sheets

(56) References Cited

U.S. PATENT DOCUMENTS

| | | |
|---|---|---|
| 2010/0229077 A1 | 9/2010 | Sugita |
| 2015/0055405 A1 | 2/2015 | Shiratake |
| 2015/0287444 A1 | 10/2015 | Lee et al. |
| 2017/0032125 A1 | 2/2017 | Lee et al. |

OTHER PUBLICATIONS

U.S. PTO Non-Final Office Action issued in related parent U.S. Appl. No. 16/859,463, dated Jan. 7, 2021.
U.S. PTO Notice of Allowance issued in related parent U.S. Appl. No. 16/859,463, dated Jul. 9, 2021.
Related parent U.S. Appl. No. 16/859,463, filed Apr. 27, 2020.

* cited by examiner

SEMICONDUCTOR DEVICE AND SYSTEM USING THE SAME

This is a Continuation of U.S. patent application Ser. No. 16/859,463 filed on Apr. 27, 2020, including the specification, drawings and abstract is incorporated herein by reference in its entirety.

BACKGROUND

The present invention relates to a semiconductor device, and the present invention can be suitably applied to, for example, a semiconductor device having a general-purpose timer.

In recent years, semiconductor devices for vehicle are required to enhance functional safety. In a system to which functional safety is applied, for example, when faults occur in components constituting the system, it is possible to secure a safe state by devising for detecting the faults and reducing the effect of the fault. The semiconductor devices, which support functional safety, require a mechanism to diagnose whether the circuits are operating correctly.

In addition, semiconductor devices for vehicle are becoming increasingly sophisticated. For example, semiconductor devices for vehicle are equipped with a plurality of CPUs (Central Processing Unit) to achieve high functionality. Some CPUs receive common timer count values from a general-purpose timer. Each CPUs, for example, performs interrupt routines based on the timer count value.

A plurality of CPUs mounted on a semiconductor device for vehicle operate at high speed and perform asynchronous operations with respect to each other, thereby improving performance as a semiconductor device. Therefore, the general-purpose timer also operates asynchronously with each CPUs, and the count value from the general-purpose timer is asynchronously transferred to the CPUs.

In order to realize asynchronous transfer from general-purpose timer to CPU, the general-purpose timer converts the timer count value from binary code to gray code and outputs it. The Gray code is a such code that the Hamming distance is 1 when the count value is incremented by 1. By converting the timer count value to gray code, the CPU avoid capturing invalid data while the timer count value is changing.

In the viewpoint of functional safety, functional safety is also required for the connection between general-purpose timer and CPUs performing such asynchronous transfers. That is, detecting fault of the path between the general-purpose timer and the CPU is required.

Various methods have been proposed for detecting errors in data transferred between devices.

There are disclosed techniques listed below.

[Patent Document 1] Japanese unexamined Patent Application Publication No. 2010-211347

For example, Patent Document 1 discloses an error detection technique using an error detection code. The information processing device of Patent Document 1 generates an error detection code based on the data output from the bus slave such as a timer, and detects an error of the transmitted data based on the transmitted data and the generated error detection code.

SUMMARY

However, if an error detection code is added to the data of the timer count value converted into gray code for asynchronous transfer, the Hamming distance between adjacent codes increases. Therefore, the CPU may capture invalid data while the timer count value is changing. That is, the CPU may not be able to capture the correct timer count value. Therefore, it is difficult to apply the technique disclosed by Patent Document 1 to fault detection for path, which is performed by asynchronous transmission, such as from a general-purpose timer to CPUs.

Other objects and novel features will become apparent from the description of this specification and the accompanying drawings.

According to one embodiment, semiconductor device has a timer unit and a processing unit. The timer unit includes a binary counter, a first converter that converts a first count value output from the binary counter to a gray code to output as first gray code data. The processing unit includes a first synchronizer that captures the first gray code data transferred from the timer unit in synchronization with the system clock signal and outputs the captured first gray code data as second gray code data, and a fault detection unit that generates a data for fault detection based on the first gray code data transferred from the timer unit and compares a second count value based on the second gray code data with a third counter value based on the data for fault detection.

According to the one embodiment, it is possible to detect a fault between the general-purpose timer and the processing unit which is performed asynchronous transfer. Therefore, it is possible to improve the reliability of semiconductor device.

DETAILED DESCRIPTION

Hereinafter, a semiconductor device according to one embodiment will be described in detail by referring to the drawings. In the specification and the drawings, the same or corresponding form elements are denoted by the same reference numerals, and a repetitive description thereof is omitted. In the drawings, for convenience of description, the calibration may be omitted or simplified. Also, at least some of the embodiments may be arbitrarily combined with each other.

First Embodiment

Figure 1:
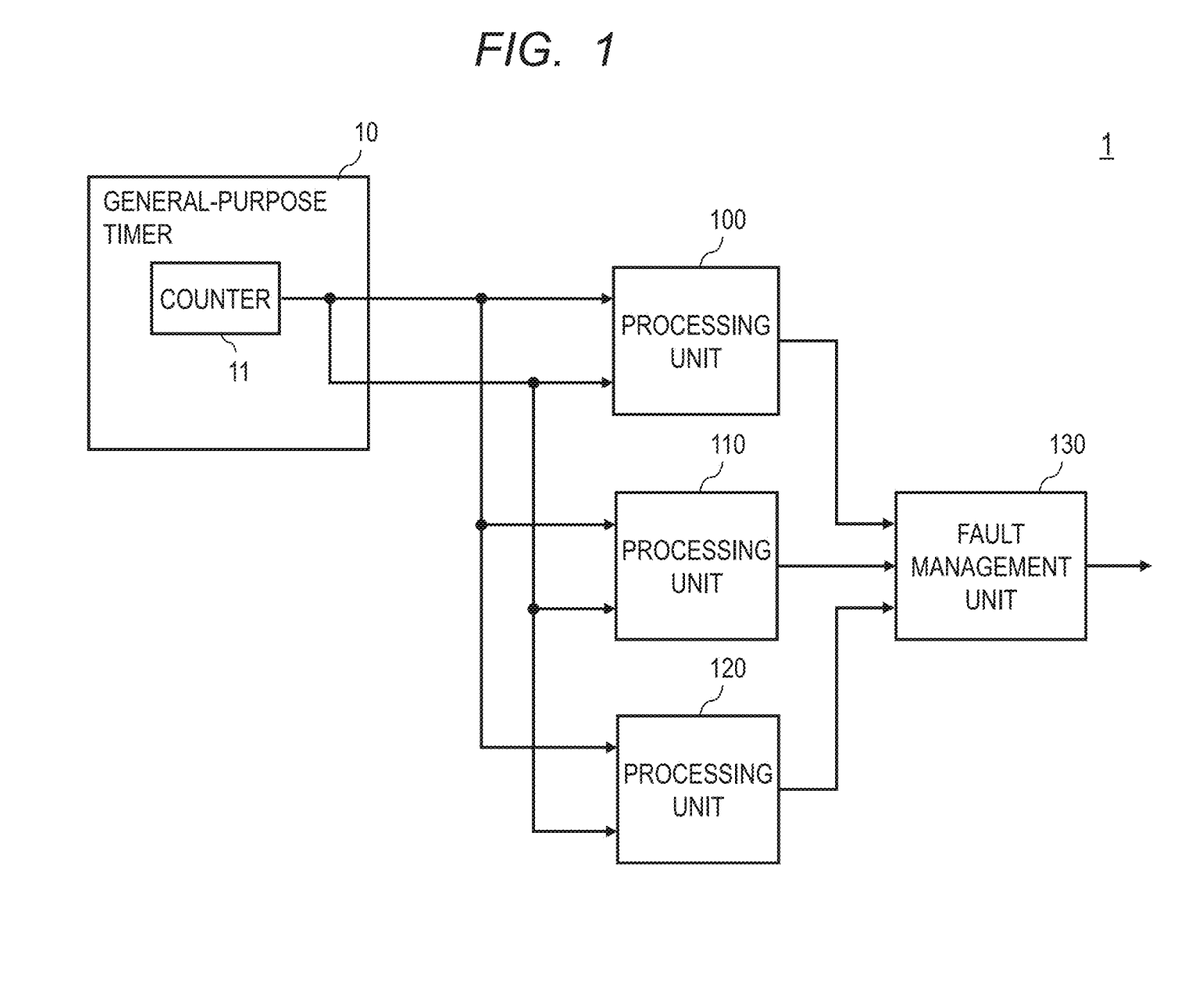
FIG. 1 is a diagram showing an exemplary configuration of a semiconductor device according to first embodiment.

FIG. 1 is a diagram showing an exemplary configuration of a semiconductor device 1 in the present embodiment. As shown in FIG. 1, the semiconductor device 1 includes a general-purpose timer 10, the processing unit 100 to 120, and a fault management unit 130. The general-purpose timer 10, the processing units 100 to 120, and the fault management unit 130 are preferably configured as one semiconductor chip, but each or a part thereof may be a different semiconductor chip to configure a semiconductor system.

The general-purpose timer 10 includes a counter 11. The counter 11 is an up counter. The general-purpose timer 10 transfers asynchronously an output of the counter 11 to the processing units 100 to 120 as a timer count value.

The processing units 100 to 120 operate asynchronously with each other, and each perform data processing. Each of the processing units 100 to 120 receives the timer count value transferred from the general-purpose timer 10. The processing units 100 to 120 use the received timer count value, for example, as a time stamp for trace output of the debugging function, or for interrupt processing or the like. Further, each of the processing units 100 to 120 performs fault detection in the path from the general-purpose timer 10 to each processing unit.

The fault management unit 130 receives the fault detection results of the processing unit 100 to 120. As a result, the fault detection results in the respective path from the general-purpose timer 10 to respective processing unit are collected into the fault management unit to perform appropriate processing corresponding to the fault detection results, for example, interruption, reset and the like.

Figure 2:
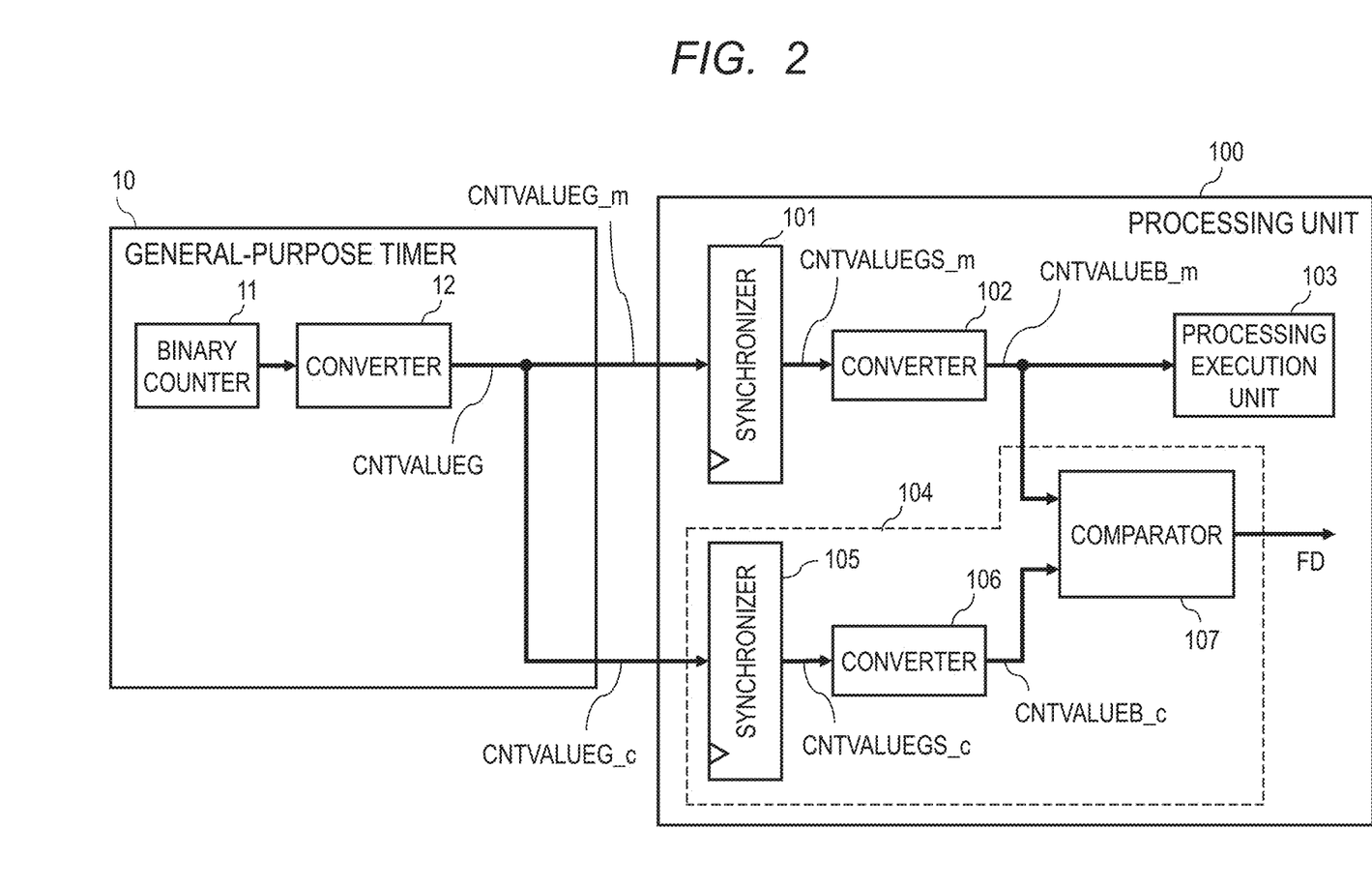
FIG. 2 is a diagram showing an example of a configuration of a general-purpose timer and a processing unit according to first embodiment.

Furthermore, with reference to FIG. 2, the general-purpose timer 10 and the processing unit 100 will be described. FIG. 2 is a block diagram showing an example of a detailed configuration of the general-purpose timer 10 and the processing unit 100. Since the configuration example of the processing units 110 and 120 in FIG. 1 is the same as the case of the processing unit 100, the description thereof is omitted.

The general-purpose timer 10 includes a converter 12 in addition to the counter 11. The counter 11 is a binary counter and outputs count values counting up in binary code. The count value is the timer count value of the general-purpose timer 10. The converter 12 converts data from a binary code to a gray code. Therefore, data output from the counter 11 is converted from a binary code to a gray code. The data converted into the gray code by the converter 12 is outputted as a gray code data CNTVALUEG (also referred to as first gray code data). The general-purpose timer 10 duplicates the gray code data CNTVALUEG and transfers them to the processing unit 100 as gray code data CNTVALUEG_m and gray code data CNTVALUEG_c. The gray code data CNTVALUEG_c is used for fault detection.

The processing unit 100 includes a synchronizer 101, a converter 102, a processing execution unit 103, and a fault detection unit 104, and receives the gray code data CNTVALUEG_m and the gray code data CNTVALUEG_c from the general-purpose timer 10.

The synchronizer 101 captures the received signal in synchronization with the system clock signal of the processing unit 100. That is, the synchronizer 101 captures the gray code data CNTVALUEG_m in synchronization with the system clock signal of the processing unit 100, and outputs the gray code data CNTVALUEGS_m (also referred to as second gray code data).

The converter 102 converts data from a gray code to a binary code. The converter 102 converts the gray code data CNTVALUEGS_m into a binary code, and outputs the binary code data CNTVALUEB_m. Thus, the timer count value transferred from the general-purpose timer 10 in gray code is converted into the timer count value in the binary code, and the binary code data CNTVALUEB_m is supplied to the processing execution unit 103 as the timer count value.

The processing execution unit 103 performs processing such as interrupts in accordance with the timer count value indicated by the binary code data CNTVALUEB_m.

The fault detection unit 104 includes a synchronizer 105, and a converter 106 and the comparator 107.

The synchronizer 105 receives the gray code data CNTVALUEG_c. The synchronizer 105 captures the gray code data CNTVALUEG_c in synchronization with the system clock signal of the processing unit 100, and outputs the gray code data CNTVALUEGS_c (also referred to as data for fault detection).

The converter 106, like the converter 102, converts data in a gray code into data in a binary code. The converter 106 converts the gray code data CNTVALUEGS_c into data in a binary code to output as binary code data CNTVALUEB_c.

The comparator 107 compares the count value (also referred to as second count value) indicated by the binary code data CNTVALUEB_m with the count value (also referred to as third count value) indicated by the binary code data CNTVALUEB_c, and outputs an fault detection signal FD according to the comparison result. For example, when the count value (second count value) indicated by the binary code data CNTVALUEB_m matches the count value (third count value) indicated by the binary code data CNTVALUEB_c, it is determined that a fault has not occurred in the path from the general-purpose timer 10 to the processing unit 100.

Incidentally, the synchronizers 101 and 105 are affected by the delay due to the clock wirings of the synchronizers 101 and 105. Therefore, there is a possibility that the timing at which the synchronizer 101 captures the gray code data CNTVALUEG_m is different from the timing at which the synchronizer 105 captures the gray code data CNTVALUEG_c. In addition, since the general-purpose timer 10 is asynchronous to the processing unit 100, the count values indicated by the synchronization data CNTVALUEGS_m and CNTVALUEGS_c may not coincide with each other. That is, if it is determined only whether the count value indicated by the binary code data CNTVALUEB_m matches the count value indicated by the binary code data CNTVALUEB_c, even if there is no path fault, there is a possibility that it is erroneously determined that the path fault has occurred.

Therefore, the comparator 107 determines not only whether the count value indicated by the binary code data CNTVALUEB_m matches the count value indicated by the binary code data CNTVALUEB_c but also whether the difference between the count values indicated by the binary code data CNTVALUEB_m and CNTVALUEB_c is less than or equal to a predetermined value. Specifically, the comparator 107 determines that there is no fault (no path fault) when the difference is equal to or smaller than "1", and determines that there is a fault when the difference is larger than "1".

Figure 3:
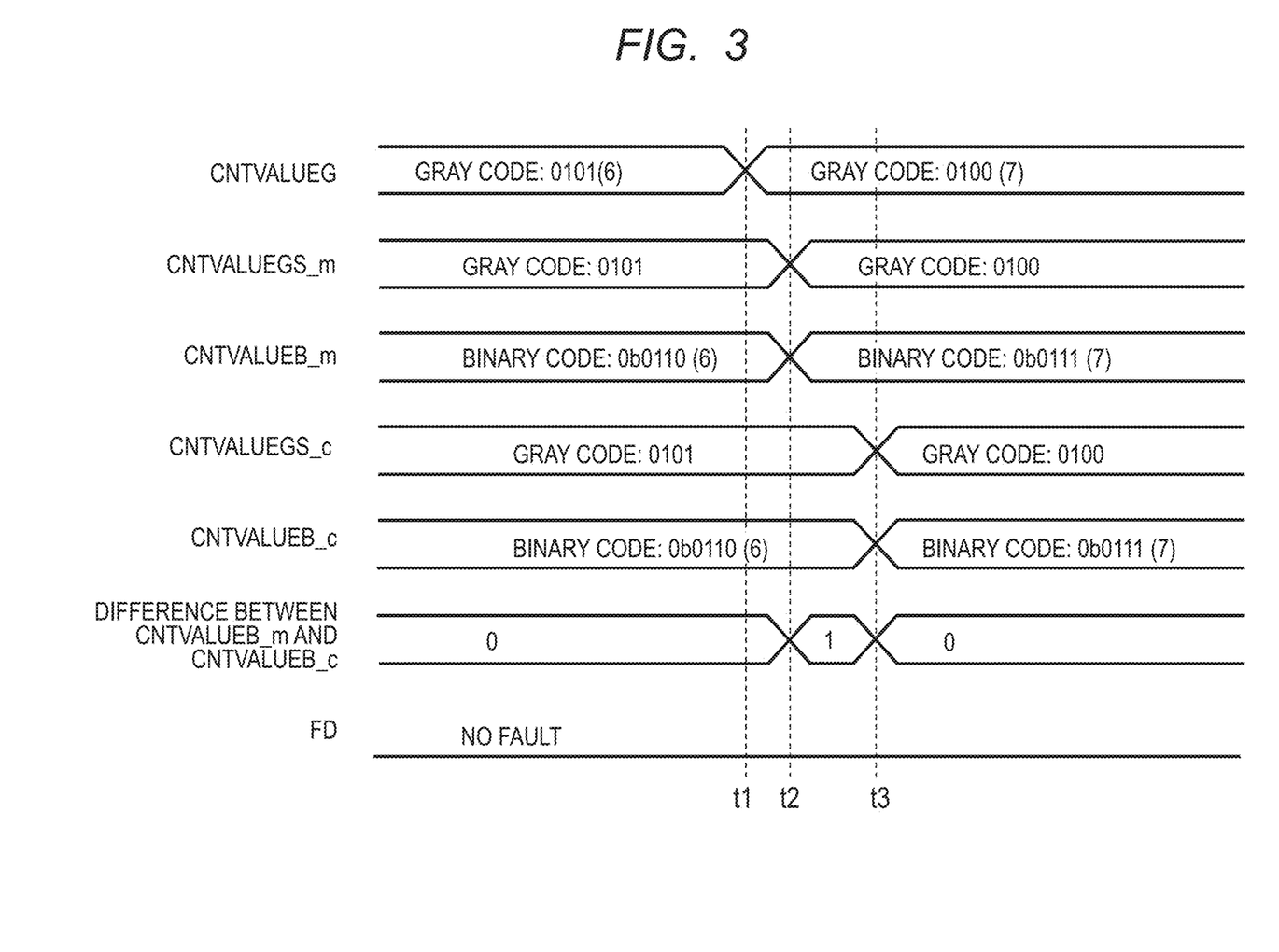
FIG. 3 is a diagram illustrating an exemplary operation of semiconductor device according to first embodiment.
Figure 4:
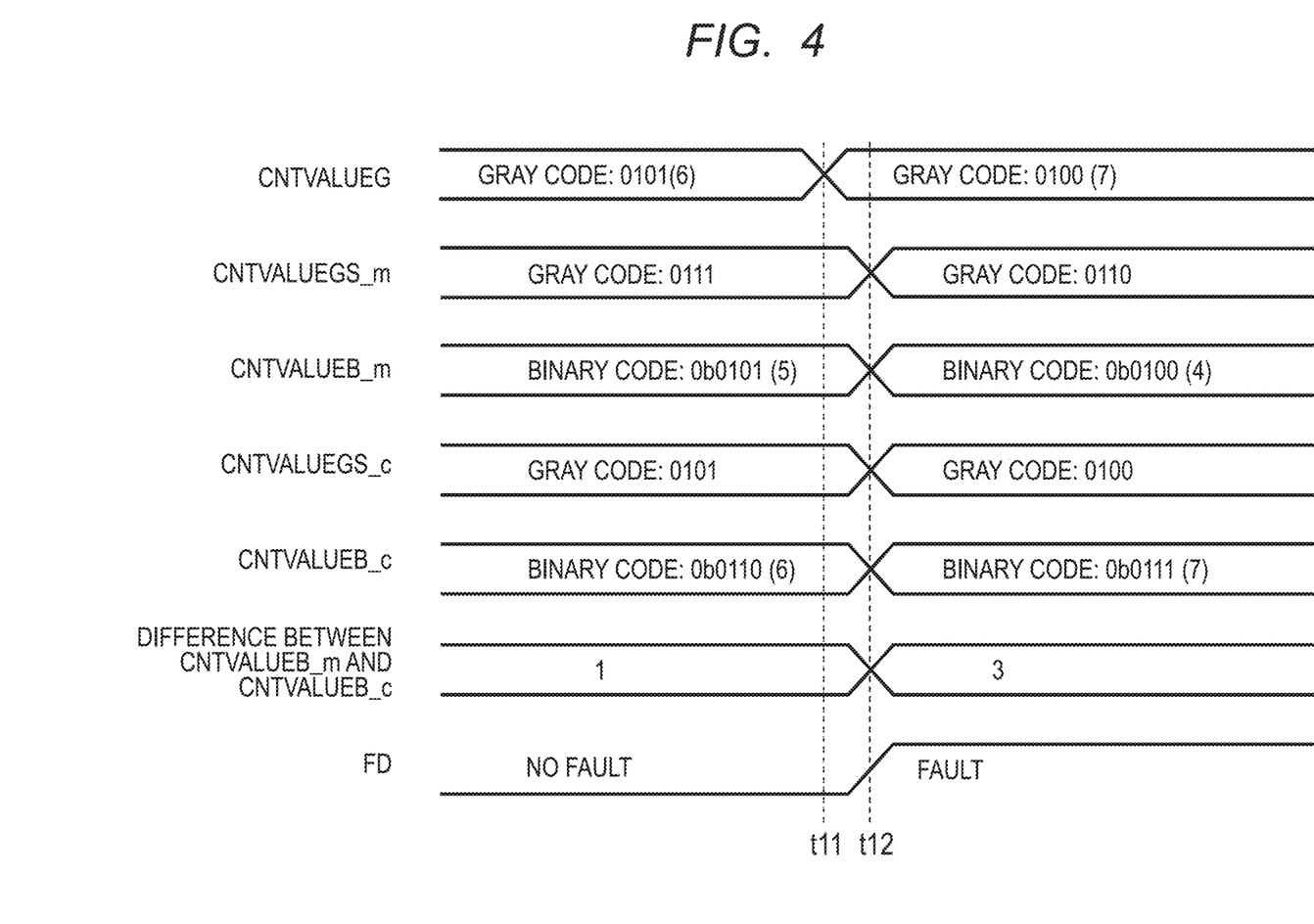
FIG. 4 is a diagram illustrating another exemplary operation of semiconductor device according to first embodiment.

Next, with reference to FIGS. 3 and 4, the operation of the asynchronous transfer of the timer counter value from the general-purpose timer 10 to the processing unit 100 and the operation of the fault detection unit 104 will be described. FIGS. 3 and 4 illustrate an example in which the timer count value output from the general-purpose timer 10 is counted up from "6" to "7". The predetermined value is set to "1", and the comparator 107 outputs the fault detection signal FD indicating an occurrence of the fault when the difference between the count values indicated by the binary code data CNTVALUEB_m and CNTVALUEB_c is larger than "1".

FIG. 3 is a diagram illustrating an operation when there is no fault on the path between the processing unit 100 and the general-purpose timer 10. Further, in FIG. 3, the case where the synchronizer 101 captures data before the synchronizer 105 is shown.

Before time t1, "0101" indicating "6" is outputted as gray code data CNTVALUEG from the general-purpose timer 10. At this time, gray code data CNTVALUEG_m and CNTVALUEG_c which are "0101" are transferred to the processing unit 100. The gray code data CNTVALUEG_m and CNTVALUEG_c are captured in synchronization with the system clock signal of the processing unit 100 by the synchronizers 101 and 105, respectively, and are converted into binary codes by the converters 102 and 106. The binary code data CNTVALUEB_m and CNTVALUEB_c converted by converters 102 and 106 become both "0b0110." Therefore, the difference between the count values indicated by the binary code data CNTVALUEB_m and CNTVALUEB_c becomes "0", and the comparator 107 outputs the fault detection signal FD of an inactive level indicating that there is no fault.

When the timer count value outputted from the general-purpose timer 10 is counted up from "6" to "7" at time t1, the gray code data CNTVALUEG changes from "0101" to "0100". Therefore, the general-purpose timer 10 outputs the gray code data CNTVALUEG_m and the gray code data CNTVALUEG_c which become "0100".

At time t2, the synchronizer 101 captures the gray code data CNTVALUEG_m. The captured gray code data CNTVALUEG_m is converted into a binary code by the converter 102, and "0b0111 (7)" is outputted as the binary code data CNTVALUEB_m. However, at time t2, since the synchronizer 105 has not yet captured the gray code data CNTVALUEG_c after the count-up, the gray code data CNTVALUEGS_c remains "0101" and the binary code data CNTVALUEB_c remains "0b0110 (6)". Therefore, the difference between the count values indicated by the binary code data CNTVALUEB_m and CNTVALUEB_c becomes "1". Since the difference between the count values indicated by the binary code data CNTVALUEB_m and CNTVALUEB_c is equal to or smaller than "1" which is the predetermined value, the comparator 107 output the fault detection signal FD of inactive level.

At time t3, the synchronizer 105 captures the gray code data CNTVALUEG_c after the timer count value has been counted up to "7". The synchronizer 105 outputs gray code data CNTVALUEGS_c which is "0100". The gray code data CNTVALUEGS_c is converted into binary code by the converter 106, and "0b0111(7)" is outputted as the binary code data CNTVALUEB_c. As a result, the difference between the count values indicated by the binary code data CNTVALUEB_m and CNTVALUEB_c becomes "0", and the comparator 107 outputs the fault detection signal FD at the inactive level.

As described above, since the timer count value is counted up one by one, even if the timing at which the synchronizer 101 captures the gray code data CNTVALUEG_m deviates from the timing at which the synchronizer 105 captures the gray code data CNTVALUEG_c, the difference is always equal to or smaller than "1". Therefore, even if the deviation of the timing in which the synchronizer 101 captures the gray code data CNTVALUEG_m and the time in which the synchronizer 105 captures the gray code data CNTVAL-UEG_c is occurred caused by the delay due to the clock wiring, the path fault can be correctly detected.

Next, with reference to FIG. 4, the operation in the case where there is a path fault between the processing unit 100 and the general-purpose timer 10 will be described. In FIG. 4, the operation is shown when stuck-at 1 fault occurs at the second bit of the data in the path from the general-purpose timer 10 to the synchronizer 101.

Before the time t11, it is assumed that the gray code data CNTVALUEG "0101" indicating the timer count value is outputted from the general-purpose timer 10. In the path from the general-purpose timer 10 to the synchronizer 101, since stuck-at 1 fault occurs in the second bit of data, the gray code data CNTVALUEGS-m outputted by the synchronizer 101 becomes "0111". The gray code data CNTVAL-UEGS_m is converted into a binary code, and "0b0101(5)" is outputted as the binary code data CNTVALUEB_m to the comparator 107. On the other hand, since there is no fault in the path from the general-purpose timer 10 to the synchronizer 105, the synchronizer 105 correctly captures the gray code data CNTVALUEG_c output from the general-purpose timer 10. That is, the binary code data CNTVALUEB_c becomes "0b0110(6)". Therefore, the difference between the count values indicated by the binary code data CNTVAL-UEB_m and CNTVALUEB_c is "1", i.e., smaller than or equal to the predetermined value. Therefore, the fault detection signal FD indicates an inactive level. That is, at this point, no fault is detected.

Since the general-purpose timer 10 and the processing unit 100 is asynchronous, the timing at which the timer count value of the general-purpose timer 10 changes is not defined. Therefore, even if the processing execution unit 103 receives the binary code data CNTVALUEB_m captured via the stuck-at fault path, in the case of the stuck-at fault shown in FIG. 4, the situation is the same as when the timer count value is not counted up, so that the problems in the operation of the processing execution unit 103 does not occur.

Next, at time t11, when the timer count value outputted from the general-purpose timer 10 is counted up from "6" to "7", the gray code data CNTVALUEG changes from "0101" to "0100".

At time t12, the synchronizers 101 and 105 capture the gray code data CNTVALUEG_m and CNTVALUEG_c, respectively. In the path from the general-purpose timer 10 to the synchronizer 101, since stuck-at 1 fault occurs in the second bit of data, the synchronizer 101 outputs "0110" as gray code data CNTVALUEGS-m. On the other hand, since no fault occurs in the path from the general-purpose timer 10 to the synchronizer 105, the synchronizer 105 outputs "0100" as gray code data CNTVALUEGS_c. The gray code data CNTVALUEGS_m and CNTVALUEGS_c are converted into binary codes by converters 102 and 106, respectively. The converter 102 outputs the binary code "0b0100 (4)" corresponding to the gray code "0110" as binary code data CNTVALUEB-m. The converter 106 outputs the binary code "0b0111 (7)" corresponding to the gray code "0100" as the binary code data CNTVALUEB_c. Thus, the difference between the count values indicated by the binary code data CNTVALUEB_m and CNTVALUEB_c, is "3", i.e., larger than the predetermined value. Therefore, the fault detection signal FD output from the comparator 107 becomes an active level indicating that a fault has occurred.

As described above, the fault detection signal FD is generated when the timer count value indicated by the binary code data CNTVALUEB-m supplied to the process executing unit 103 changes from "5" to "4". In other words, the fault is detected at the timing at which the timer count value that should be counted up decreases from "5" to "4".

According to first embodiment, a path fault between the general-purpose timer 10 and the processing unit 100 can be detected by duplicating the gray code data CNTVALUEG from the general-purpose timer 10 and comparing the duplicated gray code data by the processing unit 100 after synchronization. Since the general-purpose timer 10 and the processing unit 100 operate asynchronously, even if there is no fault in the path from the general-purpose timer 10 to the processing unit 100, the counter values indicated by the gray code data CNTVALUEGS_m and CNTVALUEGS_c captured by the synchronizers 101 and 105 may deviate by "1". Therefore, the comparison circuit 107 determines that a fault has occurred when the difference between the counter values indicated by the gray code data CNTVALUEGS_m and CNTVALUEGS_c is larger than "1", thereby avoiding erroneous determination. Consequently, the reliability of semiconductor device 1 can be improved.

Modified Example of Comparator

Figure 5:
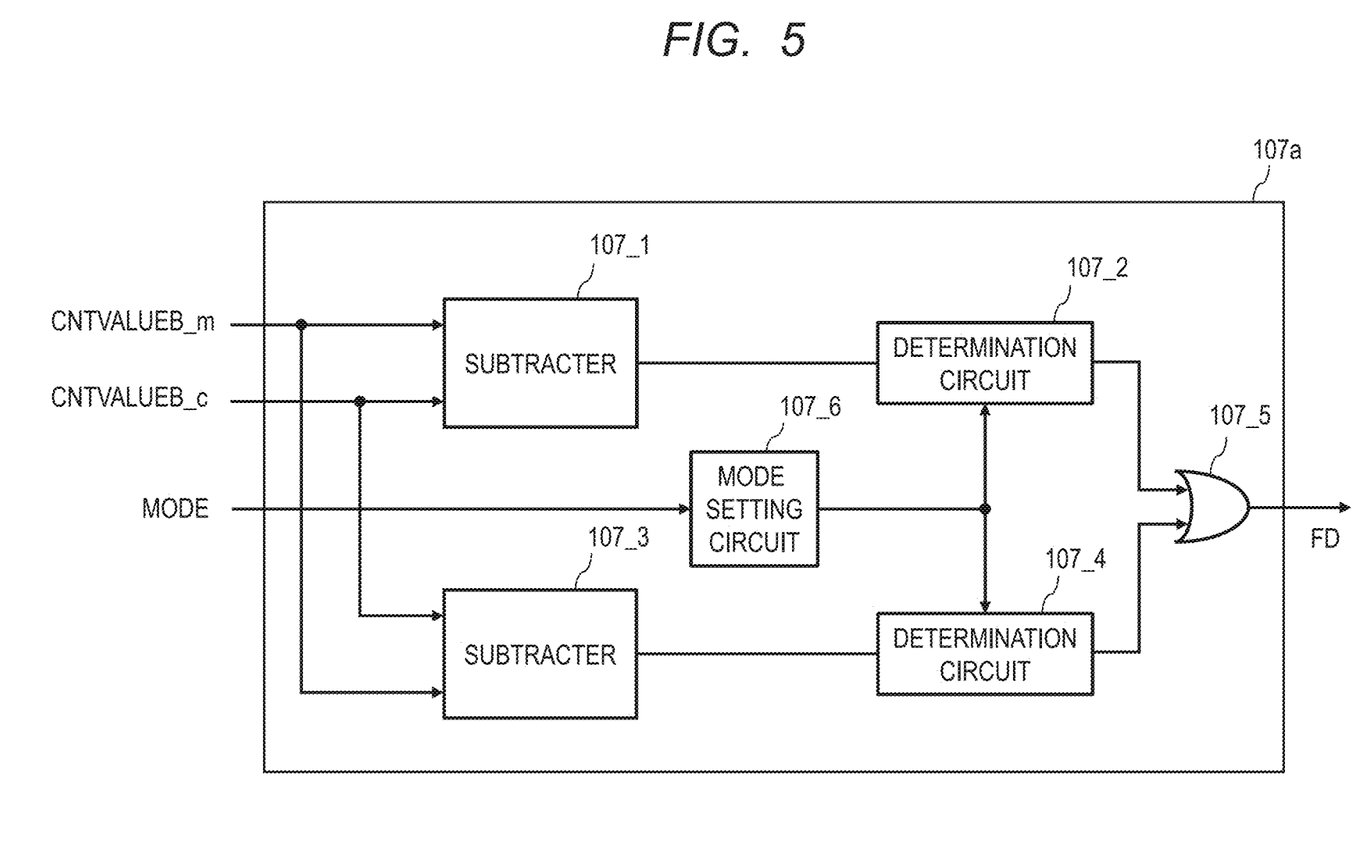
FIG. 5 is a diagram showing a modified example of the configuration of the comparison circuit.

FIG. 5 is a block diagram showing modified example of the comparator 107. The comparator 107a, which is a modified example of the comparator 107, includes subtracters 107_1 and 107_3, determination circuits 107_2 and 107_4, and an OR circuit 107_5.

The subtracters 107_1 and 107_3 subtract the count values indicated by binary code data CNTVALUEB_m and CNTVALUEB_c. Here, the subtrahends and minuends of the subtracters 107_1 and 107_3 are interchanged. That is, the subtracter 107_1 subtracts the binary code data CNTVALUEB_c from the binary code data CNTVALUEB_m, and the subtracter 107_3 subtracts the binary code data CNTVALUEB_m from the binary code data CNTVALUEB_c.

The determination circuits 107_2 and 107_4 receive the differences between the count values from the subtracters 107_1 and 107_3, respectively, and respectively determine whether or not the corresponding difference between the count values are equal to or smaller than the predetermined value. The determination circuits 107_2 and 107_4 respectively output "1" as a determination result when the corresponding difference between the count values are larger than the predetermined value.

The OR circuit 107_5 outputs the fault detection signal FD based on the determination results of the determination circuits 107_2 and 107_4. The OR circuit 107_5 outputs the fault detection signal FD which is activated when at least one of the determination results of the determination circuits 107_2 and 107_4 indicates "1".

As described above, in the present modified example, two subtracters are provided in which the subtrahend and the minuend are interchanged from each other, and a fault is detected according to the consequences of the subtracters. Thus, even if either of the synchronizer 101 and the synchronizer 105 captures the data first, a fault is correctly detected. For example, if only one subtracter is used, the difference between the count values may be a negative value. If the difference between the count values indicating the negative value is equal to or smaller than the predetermined value, there is a possibility that the faults is not detected even if the path fault occurs. However, as in the present modified example, when a subtracter in which the subtrahend and the minuend are interchanged is further provided, the result of one subtraction circuit shows a negative value, but the result of the other subtraction circuit shows a positive value. Therefore, if either one of the differences between the count values which are the results of the subtracters is larger than the predetermined value, it is possible to detect a fault. In other words, the comparator 107 according to the present modified example determines whether or not the absolute value of the difference between the count values indicated by the binary code data CNTVALUEB_m and CNTVALUEB_c is equal to or smaller than the predetermined value, and outputs the fault detection signal FD based on the determination result. Thus, it is possible to further improve the reliability of semiconductor device 1.

As shown in FIG. 5, the comparator 107a may further include a mode setting circuit 107_6. In this instance, the mode setting circuit 107_6 may set the predetermined value to the determination circuits 107_2 and 107_4 in accordance with the mode setting signals MODE supplied from the outside.

Second Embodiment

Figure 6:
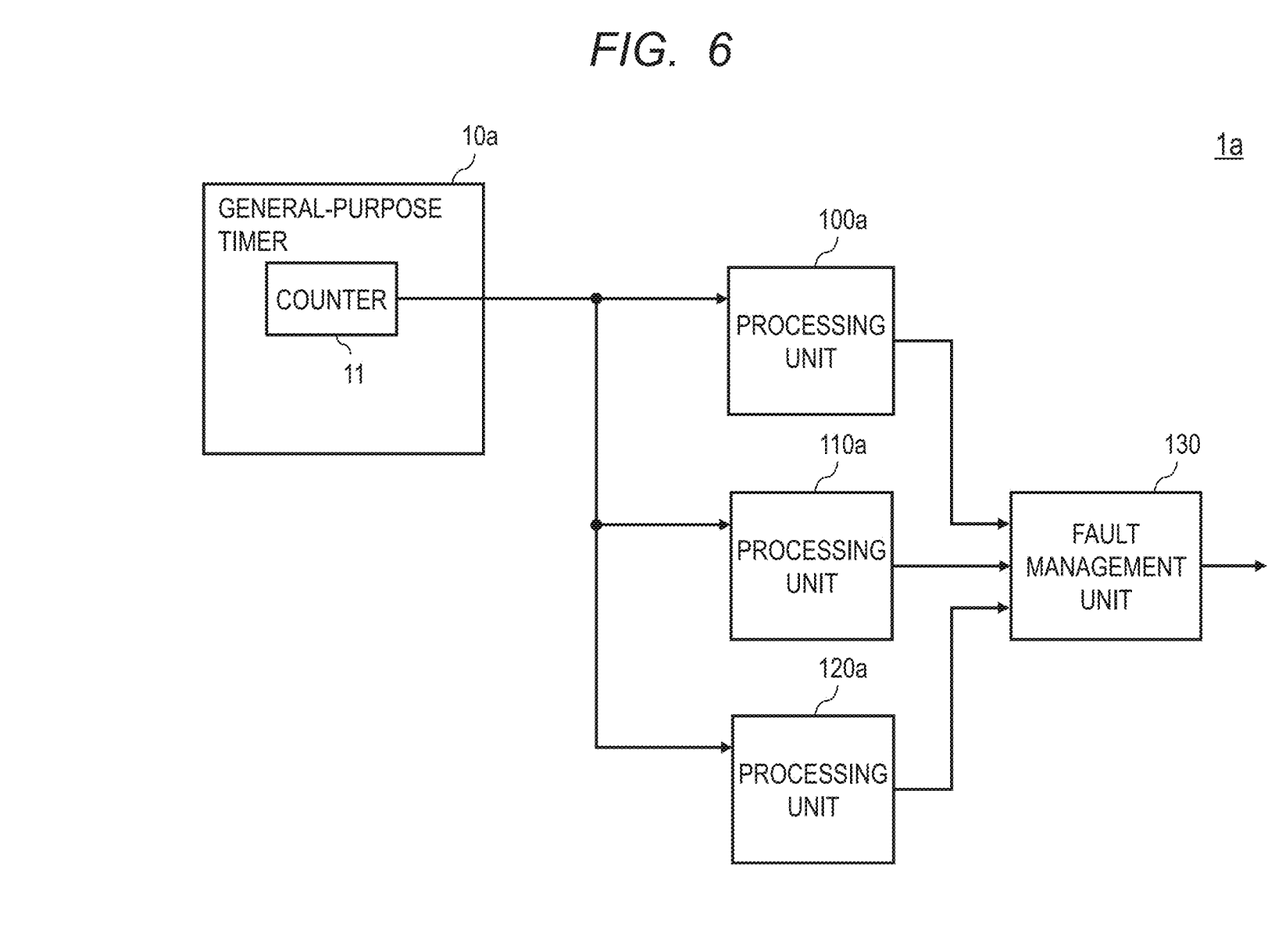
FIG. 6 is a diagram illustrating an exemplary configuration of a semiconductor device according to second embodiment.
Figure 7:
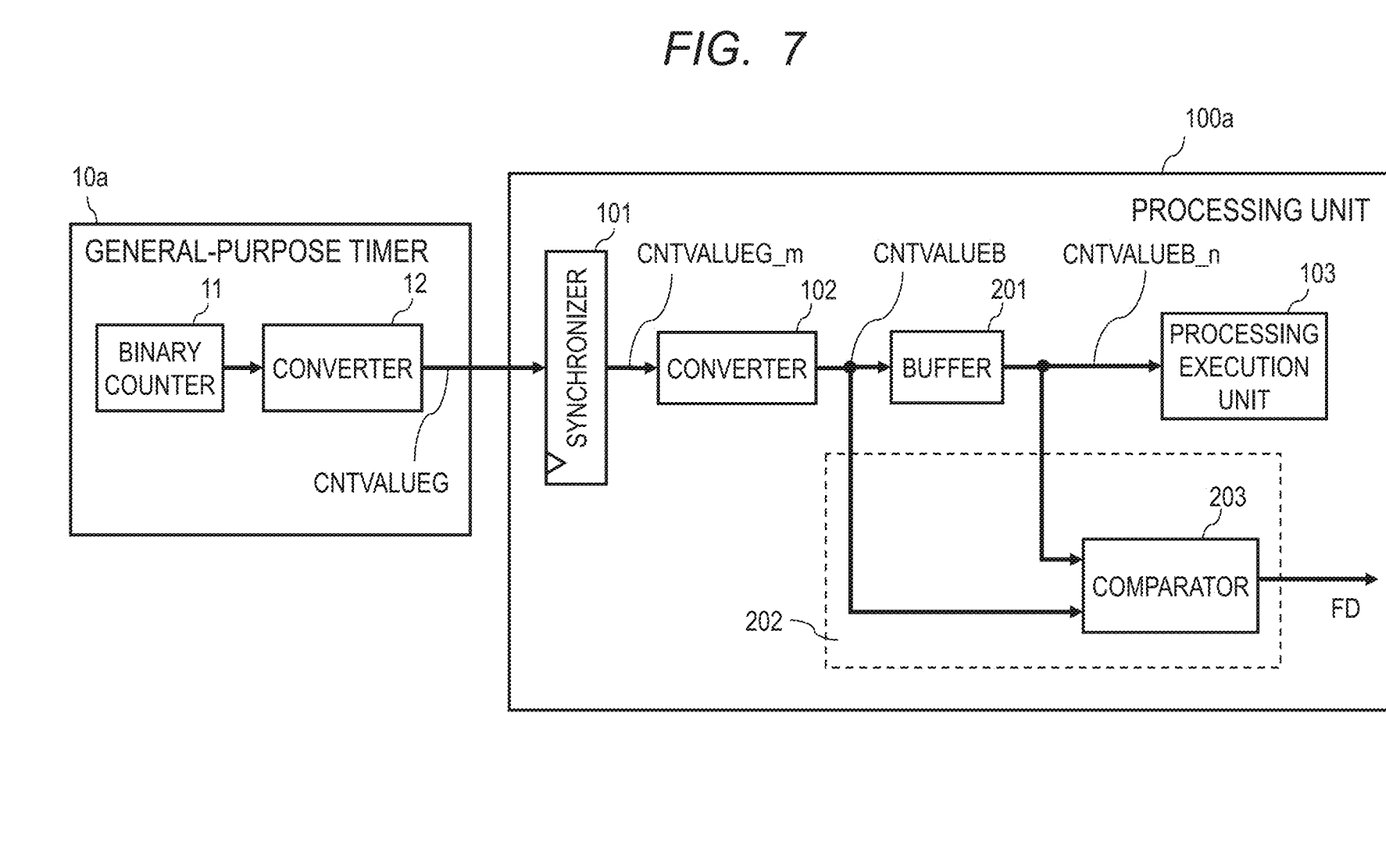
FIG. 7 is a diagram showing an example of a configuration of a general-purpose timer and a processing unit according to second embodiment.

Next, second embodiment will be described. In second embodiment, a semiconductor device 1a, which is another form of semiconductor device 1 according to first embodiment, will be described. FIG. 6 is a block diagram showing an example of the configurations of semiconductor device 1a according to second embodiment, and FIG. 7 is a block diagram showing an example of the detailed configuration of the general-purpose timer 10a and the processing unit 100a according to second embodiment. As shown in FIG. 6, semiconductor device 1a differs from semiconductor device 1 of FIG. 1 described in first embodiment in that it has a general-purpose timer 10a instead of the general-purpose timer 10, and processing units 100a to 120a instead of processing units 100 to 120. In second embodiment, the fault management unit 130 of semiconductor device 1a may be the same as that shown in FIG. 1, and therefore, a description thereof will not be omitted here.

As shown in FIG. 6, the general-purpose timer 10a differs from the general-purpose timer of first embodiment in that the output of the counter 11 (the output of the general-purpose timer) is not duplicated.

The processing units 100a to 120a differ from the processing units 100 to 120 described in first embodiment in that the processing units 100a to 120a receive counter outputs that are not duplicated. The configuration and operation of the processing units 100a to 120a will be described later.

The general-purpose timer 10a and the processing unit 100a will be described with reference to FIG. 7. Since the processing units 110a and 120a have the same configuration as that of the processing unit 100a, the descriptions thereof are omitted.

As described above, the output of the general-purpose timer 10a is not duplicated. Other configurations and operations are the same as those of the general-purpose timer 10 of FIG. 2 described in first embodiment, and the descriptions thereof are omitted.

The processing unit 100a differs from the processing unit 100 described in first embodiment shown in FIG. 2 in that it includes a buffer 201 and a fault detection unit 202 in place of the fault detection unit 104. The other components are the same as those of the processing unit 100 shown in FIG. 2 described in first embodiment, and therefore, the same components are denoted by the same reference numerals, and descriptions thereof are omitted.

The buffer 201 receives and holds the binary code data CNTVALUEB in response to the system clock signal. Then, the buffer 201 outputs the held binary code data CNTVAL- UEB as binary code data CNTVALUEB-n in response to a subsequent system clock signal. That is, the buffer 201 delays the binary code data CNTVALUEB outputted from the converter 102 by one cycle, and supplies the delayed binary code data to the processing execution unit 103.

The processing execution unit 103 receives the binary code data CNTVALUEB_n output from the buffer 201 and performs processing such as an interrupt in accordance with the timer count value indicated by the binary code data CNTVALUEB_n.

The fault detection unit 202 includes a comparator 203. The comparator 203 compares the count value indicated by the binary code data CNTVALUEB output from the converter 102 with the count value indicated by the binary code data CNTVALUEB-n output from the buffer 201, and outputs the fault detection signal FD in accordance with the result of the comparison. That is, the output of the converter 102 is used as the data for fault detection. More specifically, the comparator 203 obtains a difference between the count value indicated by the binary code data CNTVALUEB and the count value indicated by the binary code data CNTVALUEB-n, and outputs the fault detection signal FD based on the difference.

The binary code data CNTVALUEB-n is data one cycle prior to the binary code data CNTVALUEB. The general-purpose timer 10a outputs a timer count value that counts up one by one. Therefore, if there is no fault in the path between the general-purpose timer 10a and the processing unit 100a, the difference between the count value indicated by the binary code data CNTVALUEB and the count value indicated by the binary code data CNTVALUEB-n becomes "0" or "1". Therefore, when the difference between the count value indicated by the binary code data CNTVALUEB and the count value indicated by the binary code data CNTVALUEB-n is "0" or "1", the comparator 203 outputs the fault detection signal FD of the inactive level, and outputs the fault detection signal FD of the active level indicating that there is a fault in other cases. In other words, the comparator 203 determines whether or not the difference between the count value indicated by the binary code data CNTVALUEB and the count value indicated by the binary code data CNTVALUEB-n falls within the range of "0" to "1", and outputs the fault detection signal FD in accordance with the determination result.

Figure 8:
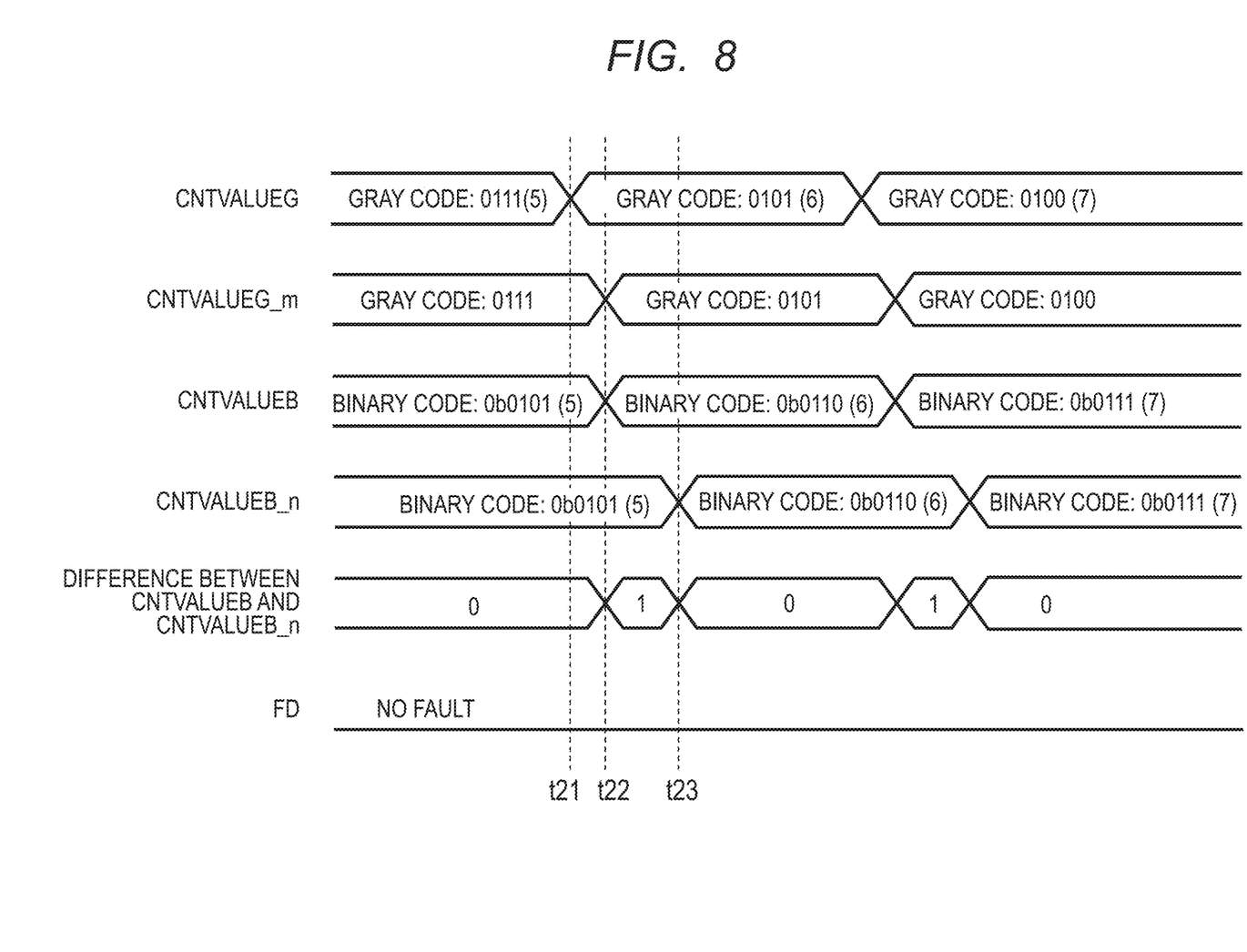
FIG. 8 is a diagram illustrating an exemplary operation of semiconductor device according to second embodiment.
Figure 9:
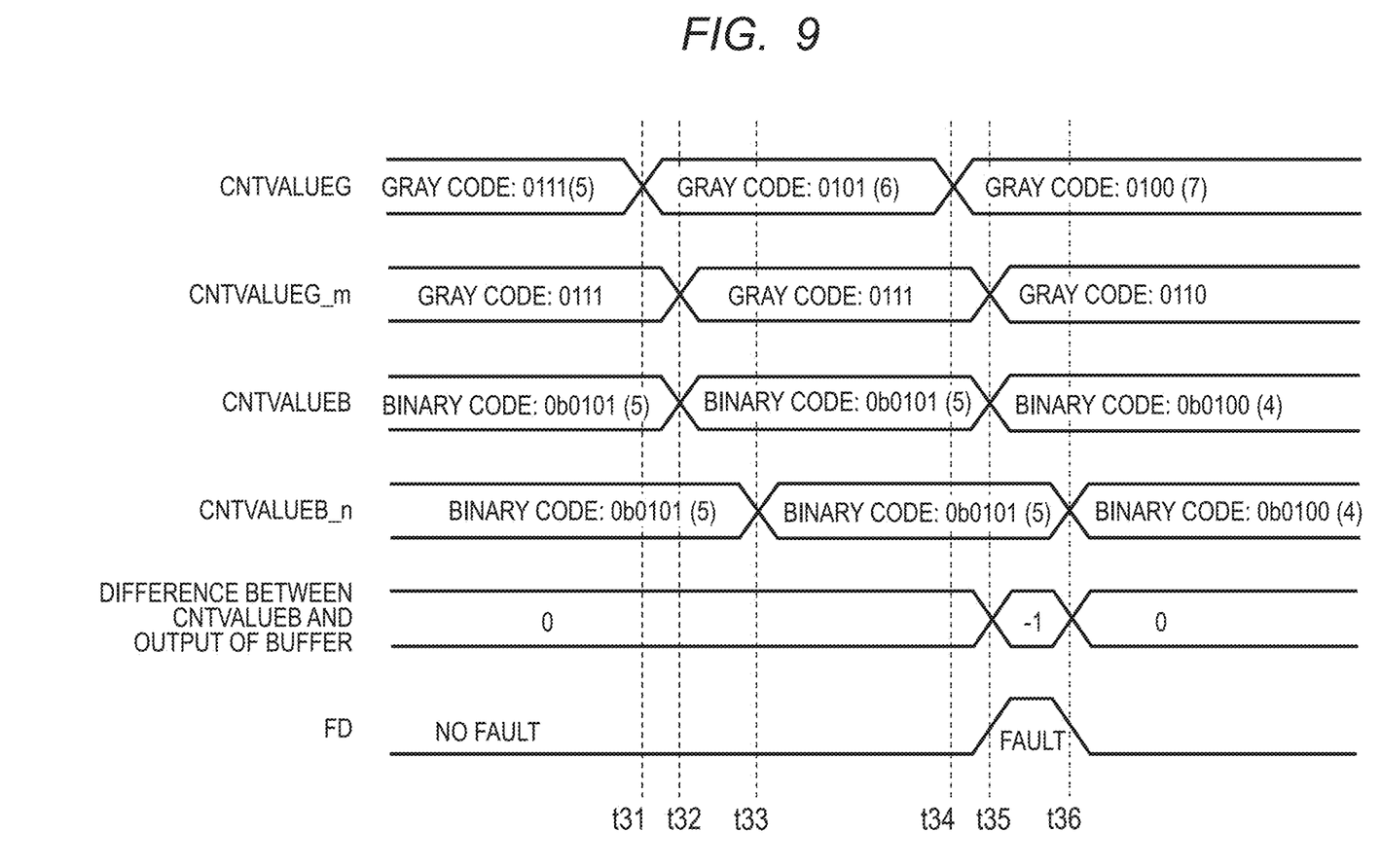
FIG. 9 is a diagram for explaining another exemplary operation of semiconductor device according to second embodiment.

Referring to FIGS. 8 and 9, the operation of asynchronous transfer of the timer count value from the general-purpose timer 10a to the processing unit 100a and the operation of the fault detection unit 202 will be described.

FIG. 8 is a diagram for explaining an operation when there is no fault on the path between the general-purpose timer 10a and the processing unit 100a.

Before time t21, the general-purpose timer 10a outputs "0111" indicating "5" as a gray code data CNTVALUEG, and the synchronizer 101 captures the gray code data CNTVALUEG in response to the system clock signal and outputs the captured gray code data to the converter 102 as a gray code data CNTVALUEG_m "0111". The converter 102 converts the gray code data CNTVALUEG-m into a binary code, and outputs "0b0101" as binary code data CNTVALUEB. Before time t21 shown in FIG. 8, the gray code data CNTVALUEG is maintained at "0111(5)", the count value indicated by the binary code data CNTVALUEB-n output from the buffer 201, which is based on the binary code data of the preceding cycle, matches the count value indicated by the binary code data CNTVALUEB output from the converter 102. Therefore, the difference becomes "0", the fault detection signal FD indicating that there is no fault is outputted from the comparator circuit 203.

At time t21, the timer count value outputted from the general-purpose timer 10a is counted up from "5" to "6", the gray code data CNTVALUEG changes from "0111" to "0101".

At time t22, the synchronizer 101 captures the gray code data CNTVALUEG and outputs "0101" as the gray code data CNTVALUEG-m. The converter 102 converts the gray code data CNTVALUEG-m into a binary code, and outputs "0b0110(6)" as binary code data CNTVALUEB. The buffer 201 outputs "0b0101(5)", which is the binary code data CNTVALUEB of the preceding cycle, as the binary code data CNTVALUEB n. At time t22, the difference between the count value indicated by the binary code data CNTVALUEB and the count value indicated by the binary code data CNTVALUEB-n becomes "1". Therefore, the comparator 203 outputs the fault detection signal FD indicating that there is no fault.

At time t23, the binary code data CNTVALUEB (0b0110 (6)) after the count-up is outputted as the binary code data CNTVALUEB-n with a delay of one cycle from the buffer 201. Therefore, at time t23, the difference between the count value indicated by the binary code data CNTVALUEB and the count value indicated by the binary code data CNTVALUEB-n becomes "0". As a result, the comparator 203 outputs the fault detection signal FD indicating that there is no fault.

When the count value output from the general-purpose timer 10a is counted up from "6" to "7", it operates in the same manner as described above.

As described above, the difference between the count value indicated by the binary code data CNTVALUEB and the count value indicated by the binary code data CNTVALUEB-n is "1" at most. Therefore, the path fault can be appropriately determined based on the count value indicated by the binary code data CNTVALUEB and the count value indicated by the binary code data CNTVALUEB-n.

Next, referring to FIG. 9, the operation in the case where there is a fault of path between the general-purpose timer 10a and the processing unit 100a will be described. In FIG. 9, the operation is shown when stuck-at 1 fault occurs at the second bit of the data in the path from the general-purpose timer 10a to the processing unit 100a.

Before time t31, the gray code data CNTVALUEG (0111) indicating the timer count "5" is outputted from the general-purpose timer 10a. In the path from the general-purpose timer 10a to the processing unit 100a, stuck-at 1 fault at the second bit of the data, the gray code data CNTVALUEG-m outputted by the synchronizer 101 is "0111". Therefore, the count value indicated by the gray code data CNTVALUEB output from the converter 102 coincides with the count value indicated by the gray code data CNTVALUEB-n output from the buffer 201, and the difference becomes "0". Thus, at this point, no faults are detected.

At time t31, the general-purpose timer 10a counts up the timer count value from "5" to "6" and outputs gray code data CNTVALUEG which is "0101(6)". The synchronizer 101 captures the gray code data CNTVALUEG outputted from the general-purpose timer 10a at time t32. However, since there is a fault in the path from the general-purpose timer 10a to the processing unit 100a, the data CNTVALUEG-m captured by the synchronizer 101 becomes "0111". The converter 102 converts the gray code data CNTVALUEG-m which is "0111" into a gray code, and outputs "0b0101(5)" as binary code data CNTVALUEB. The comparator 203 compares the binary code data CNTVALUEB_n ("0b0101") indicating the count value "5" prior to the count-up, which is outputted from the buffer 201, with the binary code data CNTVALUEB ("0b0101(5)") which is the converted result into the binary code at time t32. In this instance, the difference between the count value indicated by the gray code data CNTVALUEB and the count value indicated by the gray code data CNTVALUEB-n becomes "0", and it is determined that there is no fault even at this point in time.

At time t33, although the buffer 201 outputs the binary code data CNTVALUEB_n corresponding to the timer count value after the count-up, and the difference between the count value indicated by the gray code data CNTVALUEB and the count value indicated by the gray code data CNTVALUEB_n at this time is "0". Therefore, it is determined that there is no failure.

At time t34, the general-purpose timer 10a counts up the timer count value from "6" to "7" and outputs gray code data CNTVALUEG which is "0100(7)". The synchronizer 101 captures the gray code data CNTVALUEG outputted from the general-purpose timer 10a at time t35. However, since there is a fault in the path from the general-purpose timer 10a to the processing unit 100a, the data CNTVALUEG-m captured by the synchronizer 101 becomes "0110". The converter 102 converts the gray code data CNTVALUEG-m into a binary code, and outputs "0b0100(4)" as binary code data CNTVALUEB. At this time, the outputs of the buffer 201 is the binary code data ("0b0101 (5)") of the preceding cycle. Therefore, the difference between the count value indicated by the binary code data CNTVALUEB and the count value indicated by the binary code data CNTVALUEB_n becomes "−1". Therefore, from the comparator 203, the fault detection signal FD indicating that there is a fault is outputted.

Thus, the fault detection signal FD is outputted at the time when it is determined that the timer count value supplied to the processing executing unit 103, which should originally be counted up, is reduced.

According to second embodiment, it is possible to determine whether or not the timer count value supplied to the processing executing unit 103 correctly changes by providing the processing unit 100a with the buffer 201, and comparing the binary code data CNTVALUEB_n, which is the binary code data of the preceding cycle, obtained via the buffer 201 with the binary code data CNTVALUEB outputted from the converter 102. As a result, a path fault from the general-purpose timer 10a to the processing unit 100a can be detected, and the reliability of semiconductor device 1a can be improved.

Although one processing execution unit 103 is provided in the processing unit 100 or 100a in first or second embodiments, a plurality of processing execution units 103 may be provided, and the timer count values from the general-purpose timer 10 may be commonly supplied to the plurality of processing execution units 130. For example, each of the processing units 100 to 120 or 100a to 120a may be a CPU cluster having a plurality of CPUs, and a timer count value may be supplied commonly to the plurality of CPU clusters.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
a timer unit configured to generate a timer count value;
a processing unit having:
   a first synchronizer configured to receive the timer count value in synchronization with a system clock signal for the processing unit;
   a second synchronizer configured to receive the timer count value in synchronization with the system clock signal;
   a processing execution unit configured to receive a first timer count value indicating the value based on the timer count value received by the first synchronizer; and
   a comparator configured to compare the first timer count value with a second timer count value indicating the value based on the timer count value received by the second synchronizer to output a fault detection signal indicating a fault on a path between the timer unit and the processing unit based on a comparison result.

2. The semiconductor device according to claim 1,
wherein the comparator is configured to output the fault detection signal when a difference between the first timer count value and the second timer count value is larger than a predetermined value.

3. The semiconductor device according to claim 1,
wherein the timer count value is asynchronously transferred from the timer unit to the processing unit.

4. The semiconductor device according to claim 1,
wherein the timer count value transferred from the timer unit to the processing unit is represented in gray code.

5. The semiconductor device according to claim 4,
wherein the processing unit further comprises:
   a first converter configured to convert the timer count value in gray code which is received by the first synchronizer into the first timer count value in binary code, and
   a second converter configured to convert the timer count value in gray code which is received by the second synchronizer into the second timer count value in binary code.

6. The semiconductor device according to claim 1,
wherein a first path for transmitting the timer count value from the timer unit to the comparator through the first synchronizer is different from a second path for transmitting the timer count value from the timer unit to the comparator through the second synchronizer.

7. A semiconductor device comprising:
a timer unit configured to generate a timer count value and to output the generated time count value as a first and a second code data;
a processing unit having:
   a first synchronizer configured to receive the first code data in synchronization with a system clock signal;
   a processing execution unit configured to receive a first timer count value indicating the value based on the first code data received by the first synchronizer;
   a fault detection unit having:
      a second synchronizer configured to receive the second code data in synchronization with the system clock signal; and
      a comparator configured to compare the first timer count value and a second timer count value indicating the value based on the second code data received by the second synchronizer and to output a fault detection signal based on a difference between the first timer count value and the second timer count value.

8. The semiconductor device according to claim 7, wherein the first and the second code data is represented in gray code.

9. The semiconductor device according to claim 7, wherein the processing execution unit is a first processing execution unit, wherein the semiconductor device further includes a second processing execution unit, wherein the first processing execution unit and the second processing execution unit receive the first timer count value.

* * * * *